US007824725B2

(12) United States Patent
Pfister

(10) Patent No.: US 7,824,725 B2
(45) Date of Patent: Nov. 2, 2010

(54) METHODS FOR EXTENDING THE SHELF LIFE OF PARTIALLY SOLIDIFIED FLOWABLE COMPOSITIONS

(75) Inventor: Steve Pfister, Dunwoody, GA (US)

(73) Assignee: The Coca-Cola Company, Atlanta, GA (US)

( * ) Notice: Subject to any disclaimer, the term of this patent is extended or adjusted under 35 U.S.C. 154(b) by 246 days.

(21) Appl. No.: 12/050,988

(22) Filed: Mar. 19, 2008

(65) Prior Publication Data
US 2008/0241338 A1 Oct. 2, 2008

Related U.S. Application Data

(63) Continuation-in-part of application No. 11/694,421, filed on Mar. 30, 2007, now abandoned.

(51) Int. Cl.
A23L 2/00 (2006.01)
(52) U.S. Cl. .................. 426/590; 426/392; 426/393; 426/524
(58) Field of Classification Search ............ 426/590, 426/524, 393, 418; 62/457.4
See application file for complete search history.

(56) References Cited

U.S. PATENT DOCUMENTS

| 3,850,004 | A | | 11/1974 | Vander Arend |
| 3,916,532 | A | | 11/1975 | Jaeger et al. |
| 4,197,717 | A | * | 4/1980 | Schumacher ............. 62/213 |
| 4,342,661 | A | | 8/1982 | Ehlers et al. |
| 4,344,476 | A | | 8/1982 | Sutcliffe et al. |
| 4,345,443 | A | | 8/1982 | Yamashita |
| 4,372,866 | A | | 2/1983 | Ehlers et al. |
| 4,389,904 | A | | 6/1983 | Lacy et al. |
| 4,541,250 | A | | 9/1985 | Tropeano et al. |
| 4,690,809 | A | | 9/1987 | Nathan et al. |
| 5,241,829 | A | | 9/1993 | Irie et al. |
| 5,249,500 | A | | 10/1993 | Husseiny et al. |
| 6,018,961 | A | | 2/2000 | Venture et al. |
| 6,030,653 | A | | 2/2000 | Rosenthal |
| 6,227,287 | B1 | | 5/2001 | Tanaka et al. |
| 6,391,224 | B1 | | 5/2002 | Wowk |
| 6,787,493 | B1 | | 9/2004 | Nagaoka et al. |
| 2002/0189277 | A1 | | 12/2002 | Shigenori et al. |
| 2002/0197364 | A1 | | 12/2002 | Shyong Pan |
| 2005/0142253 | A1 | | 6/2005 | Purcell |

FOREIGN PATENT DOCUMENTS

| CA | 01141981 A1 | 3/1983 |
| CA | 01262029 A1 | 10/1989 |
| CA | 2022125 AA | 5/1991 |
| CA | 02345018 AA | 3/2000 |
| CA | 02475067 AA | 8/2003 |
| CA | 2416280 AA | 7/2004 |
| CN | 01183532 A | 6/1998 |
| DE | 3142264 A1 | 5/1983 |
| DE | 3201072 A1 | 7/1983 |
| DE | 3636976 A1 | 5/1988 |
| EP | 0041385 A1 | 12/1981 |
| EP | 0041386 A1 | 12/1981 |
| EP | 0160119 A1 | 11/1985 |
| EP | 0188630 A2 | 7/1986 |
| EP | 0227629 A2 | 7/1987 |
| EP | 0692683 A2 | 1/1996 |
| EP | 0949371 A2 | 10/1999 |
| EP | 1235046 A1 | 8/2002 |
| EP | 1454541 A | 9/2004 |
| EP | 1474632 A2 | 11/2004 |
| EP | 1522802 A1 | 4/2005 |
| ES | 0539449 A1 | 11/1985 |
| GB | 300500 A | 3/1929 |
| GB | 936065 A | 9/1963 |
| GB | 962851 A | 7/1964 |
| GB | 1114306 A | 5/1968 |
| GB | 1129626 A | 10/1968 |
| GB | 1313143 A | 4/1973 |
| GB | 1393277 A | 5/1975 |
| GB | 2057413 A | 4/1981 |

(Continued)

OTHER PUBLICATIONS

Frozen Beer tricks NPL, Nov. 30, 2006.*
"Super Cooling Showcase for Drinks—Magiquoal" presentation, Mebix, Inc., 8 pages.
Sojitz Corporation of America—Corporate Profile—President's Message, http://www.us.sojitz.com/usr/show_news.php?newsid=83, 1 page.
Ask A Scientist, General Science Archive, Freezing Properties, http://www.newton.dep.anl.gov/askasci/gen01/gen01625.htm, 3 pages.

Primary Examiner—Drew E Becker
Assistant Examiner—Preston Smith
(74) Attorney, Agent, or Firm—Sutherland Asbill & Brennan LLP

(57) ABSTRACT

The present disclosure relates a method for extending a shelf life of at least one packaged composition within a consumer accessible cooling device adapted to cool the at least one packaged composition to a composition temperature which is a first supercooled temperature. The method comprises storing the at least one packaged composition within the consumer accessible cooling device at a first supercooled temperature and increasing the composition temperature to a second temperature during a time period in which the at least one packaged composition will not be removed from the consumer accessible cooling device by a consumer. The at least one packaged composition comprises a pressurized composition in a liquid phase within a sealed container. The pressurized composition comprises a solvent and a solute substantially dissolved in the solvent and is at a pressure greater than atmospheric pressure. The pressurized composition remains liquid while the at least one packaged composition is maintained at the first supercooled temperature in the consumer accessible cooling device and at least partially freezes in response to the sealed container being removed from the consumer accessible cooling device and opened or agitated by the consumer.

24 Claims, No Drawings

FOREIGN PATENT DOCUMENTS

| | | | |
|---|---|---|---|
| GB | 2251863 | * | 7/1992 |
| GB | 2251863 | A | 7/1992 |
| GB | 2402995 | A | 12/2004 |
| JP | 57020408 | A | 2/1982 |
| JP | 57020409 | A | 2/1982 |
| JP | 58201387 | A | 11/1983 |
| JP | 62174112 | A | 7/1987 |
| JP | 63278501 | A | 11/1988 |
| JP | 01006650 | A | 1/1989 |
| JP | 01058992 | A | 3/1989 |
| JP | 02075863 | A | 3/1990 |
| JP | 02105489 | A | 4/1990 |
| JP | 02157568 | A | 6/1990 |
| JP | 02161263 | A | 6/1990 |
| JP | 02161273 | A | 6/1990 |
| JP | 02161275 | A | 6/1990 |
| JP | 03160294 | A | 7/1991 |
| JP | 04048175 | A | 2/1992 |
| JP | 04084085 | A | 3/1992 |
| JP | 04288454 | A | 10/1992 |
| JP | 04347617 | A | 12/1992 |
| JP | 5172419 | A | 7/1993 |
| JP | 5172420 | A | 7/1993 |
| JP | 05187730 | A | 7/1993 |
| JP | 05296622 | A | 11/1993 |
| JP | 06185698 | A | 7/1994 |
| JP | 6193920 | A | 7/1994 |
| JP | 6193921 | A | 7/1994 |
| JP | 6201210 | A | 7/1994 |
| JP | 06345589 | A | 12/1994 |
| JP | 7174442 | A | 7/1995 |
| JP | 07253284 | A | 10/1995 |
| JP | 07332713 | A | 12/1995 |
| JP | 037332715 | A | 12/1995 |
| JP | 08010552 | A | 1/1996 |
| JP | 08061744 | A | 3/1996 |
| JP | 08145484 | A | 6/1996 |
| JP | 08145494 | A | 6/1996 |
| JP | 8152206 | A | 6/1996 |
| JP | 8178448 | A | 7/1996 |
| JP | 08210721 | A | 8/1996 |
| JP | 08285335 | A | 11/1996 |
| JP | 09184452 | A | 7/1997 |
| JP | 09296163 | A | 11/1997 |
| JP | 10054629 | A | 2/1998 |
| JP | 10068562 | A | 3/1998 |
| JP | 10122703 | A | 5/1998 |
| JP | 10132335 | A | 5/1998 |
| JP | 10160207 | A | 6/1998 |
| JP | 10306316 | A | 11/1998 |
| JP | 2000199655 | A | 7/2000 |
| JP | 2001046029 | A | 2/2001 |
| JP | 2001137694 | A | 5/2001 |
| JP | 2001208381 | A | 8/2001 |
| JP | 2001317832 | A | 11/2001 |
| JP | 2002005726 | A | 1/2002 |
| JP | 2002090017 | A | 3/2002 |
| JP | 2003074991 | A | 3/2003 |
| JP | 2003139435 | A | 5/2003 |
| JP | 2003336911 | A | 11/2003 |
| JP | 2004053171 | A | 2/2004 |
| JP | 2004245485 | A | 9/2004 |
| JP | 2004293904 | A | 10/2004 |
| JP | 2004293949 | A | 10/2004 |
| JP | 2005156042 | A | 6/2005 |
| JP | 2005257207 | A | 9/2005 |
| JP | 2002048449 | A | 4/2008 |
| WO | 9902406 | A | 1/1999 |
| WO | 0016619 | A1 | 3/2000 |
| WO | 03067144 | A2 | 9/2003 |
| WO | 2004065767 | A1 | 8/2004 |
| WO | 2005074446 | A2 | 8/2005 |

* cited by examiner

METHODS FOR EXTENDING THE SHELF LIFE OF PARTIALLY SOLIDIFIED FLOWABLE COMPOSITIONS

CROSS REFERENCE TO RELATED APPLICATIONS

This is a continuation in part of U.S. application Ser. No. 11/694,421, filed Mar. 30, 2007, which is incorporated herein by reference in its entirety.

TECHNICAL FIELD

This invention generally relates to packaged compositions, and more particularly relates to packaged compositions for providing partially solidified flowable compositions.

BACKGROUND OF THE INVENTION

In general, some consumer products are desirably cold when consumed by an end user. Such products are usually refrigerated, placed into an ice filled container, or similar type device while still in its package if it is desired to be consumed cold. For example, consumer products such as carbonated soft drinks, iced tea, iced coffee, or other such beverages are stored in refrigerators before consumption by the end user. Alternatively, the consumer may, in the case of beverages, add ice to the beverage to cool the beverage before consumption. Furthermore, a consumer may refrigerate a beverage and then add ice to the beverage so that the cold temperature of the beverage is maintained for a longer period of time during consumption or for as long as possible.

However, the addition of ice to maintain the cold temperature of the beverage for as long as possible is not always convenient or possible. For example, a refrigerated packaged beverage purchased at a convenience store is typically consumed while the consumer is traveling, so the consumer typically does not have access to ice or a glass or cup to hold the ice and beverage. In addition, the addition of ice to maintain the cold temperature of the beverage dilutes the beverage and its taste as the ice melts. Accordingly, there is a desire for a method of conveniently providing packaged consumer products that can maintain the cold temperature of a packaged product for as long as possible while eliminating the aforementioned deficiencies.

SUMMARY OF THE INVENTION

The present disclosure encompasses a method for extending a shelf life of at least one packaged composition within a consumer accessible cooling device adapted to cool the at least one packaged composition to a composition temperature which is a first supercooled temperature. The method comprises storing the at least one packaged composition within the consumer accessible cooling device at a first supercooled temperature and increasing the composition temperature to a second temperature during a time period in which the at least one packaged composition will not be removed from the consumer accessible cooling device by a consumer. The at least one packaged composition comprises a pressurized composition in a liquid phase within a sealed container. The pressurized composition comprises a solvent and a solute substantially dissolved in the solvent and is at a pressure greater than atmospheric pressure. The pressurized composition remains liquid while the at least one packaged composition is maintained at the first supercooled temperature in the consumer accessible cooling device and at least partially freezes in response to the sealed container being removed from the consumer accessible cooling device and opened or agitated by the consumer.

The present disclosure also provides a method for providing a packaged composition comprising providing a pressurized composition in a liquid phase within a sealed container, cooling the pressurized composition in the sealed container in a consumer accessible cooling device at a point of sale to a composition temperature which is a first supercooled temperature, where the pressure and the first supercool temperature is maintained such that the pressurized composition at least partially freezes in response to the sealed container being removed from the consumer accessible cooling device and opened or agitated by a consumer but remains flowable, and increasing the composition temperature to a second temperature during a time period in which the at least one packaged composition will not be removed from the consumer accessible cooling device by a consumer. The pressurized composition comprises a solvent and a solute substantially dissolved in the solvent and is at a pressure greater than atmospheric pressure.

Other objects, features, and advantages of this invention will be apparent from the following detailed description, drawing, and claims.

DETAILED DESCRIPTION OF THE EMBODIMENTS

As summarized above, this disclosure encompasses a method for extending the shelf life of a packaged composition and a method for providing a partially solidified flowable compositions. The packaged composition comprises a sealed container and a pressurized composition in the liquid phase within the sealed container. The pressurized composition is at a pressure greater than atmospheric pressure such that while the pressurized composition is maintained at a supercool temperature within the sealed container, the pressurized composition remains in the liquid phase while the sealed container remains sealed in the consumer accessible cooling device and at least partially freezes in response to the sealed container being removed from the consumer accessible cooling device and opened or agitated by a consumer.

As used herein, the term "shelf-life" refers to the amount of time the pressurized composition can remain in the liquid phase while the sealed container remains sealed and at least partially freezes in response to the sealed container being removed from the consumer accessible cooling device and opened or agitated by a consumer when at a supercool temperature. In some embodiments, the pressurized composition remains in the liquid phase for up to 1 year while the sealed container remains sealed in the consumer accessible cooling device and at least partially freezes in response to the sealed container being removed from the consumer accessible cooling device and opened or agitated by a consumer.

According to particular embodiments of the present invention, the packaged composition is characterized such that the pressurized composition is adapted to remain in a liquid phase for up to 6 months to 1 year while the sealed container remains sealed in the consumer accessible cooling device and yet partially freezes in response to the sealed container being removed from the consumer accessible cooling device and opened or agitated by a consumer. In other embodiments, the packaged composition is characterized such that the pressurized composition is adapted to remain in a liquid phase for up to 3 months to 4 months while the sealed container remains sealed in the consumer accessible cooling device and yet partially freezes in response to the sealed container being removed from the consumer accessible cooling device and opened or agitated by a consumer. The capability of the pressurized composition to remain liquid while the sealed container remains sealed in the consumer accessible cooling device for extended periods of time and yet still partially freezes in response to the sealed container being removed from the consumer accessible cooling device and opened or agitated by a consumer allows for partially solidified flowable compositions to be reliably provided to a consumer commercially, even though the packaged composition may be exposed to a temperature less than the supercool temperature upon consumer access to the consumer assessable cooling device, which is likely to occur repeatedly. In one example, the consumer accessible cooling device may be a chiller with a door slightly larger than the sealed container.

In particular embodiments, the shelf life of the packaged composition may be extended by increasing the temperature of the packaged composition to a temperature greater than a supercool temperature during a time period in which the packaged composition will not be removed from the consumer accessible cooling device by a consumer. For example, the temperature of the packaged composition may be increased during a time with the consumer accessible cooling device is not accessible to a consumer. For instance, the consumer accessible cooling device may be located in a store which closes for certain hours. During these hours when the store is closed, the temperature of the packaged composition may be increased, as it is not desired to provide a partially solidified flowable composition. In particular embodiments, temperature may be increased above the freezing point of the pressurized composition to extend its shelf life.

Without being bound by theory, embodiments of the packaged composition at a supercool temperature can be considered to be in a quasi-stable condition. Thus, in some embodiments, shelf life is equivalent to the time for the pressurized composition to begin freezing. In some embodiments, the pressurized composition at a supercool temperature will begin freezing when crystal nucleation sites are available and when the freeze point is no longer depressed due to gas pressure and solid additives (e.g., sugar, sweeteners, or sucrose equivalents). By elevating the temperature above the supercool temperature, the pressurized composition becomes more stable and freezing may not be possible. Thus, reducing the time the packaged composition spends at a supercool temperature reduces the opportunity for freezing to occur and extends the shelf life of the packaged composition. Once freezing of a pressurized composition in the sealed container has started, partial freezing of the pressurized composition in response to the sealed container being removed from the consumer accessible cooling device and opened or agitated by a consumer could still be achieved by elevating the temperature of the packaged composition to completely melt the ice and then returning the packaged composition to the supercool temperature. In such embodiments, the shelf life of the packaged composition is extended by temporarily elevating the temperature above a supercool temperature. In other embodiments, the shelf life could also be extended where the freezing of the pressurized composition has not begun in the sealed container. In some embodiments, a consumer accessible cooling device will be used to store more than one or many packaged compositions in compartment and some pressurized compositions may begin freezing sooner than others. In these embodiment, the frozen pressurized compositions can be thawed by elevating the temperature of the consumer accessible cooling device above a supercool temperature.

In other embodiments of the present invention, the temperature of the composition may be between −5.0° C. and 20° C. during a time period in which the packaged composition will not be removed from the consumer accessible cooling device by a consumer. In yet other embodiments, the temperature of the composition may be between 0° C. and 10° C. during a time period in which the packaged composition will not be removed from the consumer accessible cooling device by a consumer. In still other embodiments, the temperature of the composition may be between 0° C. and 5° C. during a time period in which the packaged composition will not be removed from the consumer accessible cooling device by a consumer.

In particular embodiments of the present invention, the shelf life of the packaged composition is extended by up to 12 months by increasing the temperature of the packaged composition to a temperature greater than a supercool temperature during a time period in which the packaged composition will not be removed from the consumer accessible cooling device by a consumer. In more particular embodiments of the present invention, the shelf life of the packaged composition is extended by up to 3 months by increasing the temperature of the packaged composition to a temperature greater than a supercool temperature during a time period in which the packaged composition will not be removed from the consumer accessible cooling device by a consumer. In still more particular embodiments of the present invention, the shelf life of the packaged composition is extended by up to 1 month by increasing the temperature of the packaged composition to a temperature greater than a supercool temperature during a time period in which the packaged composition will not be removed from the consumer accessible cooling device by a consumer.

In addition, extending the shelf life of the packaged composition, increasing the temperature of the packaged composition to a temperature greater than a supercool temperature during a time period in which the packaged composition will not be removed from the consumer accessible cooling device by a consumer also reduces the energy used by the consumer accessible cooling device. In some embodiments, increasing the temperature of the packaged composition to a temperature greater than a supercool temperature during a time period in which the packaged composition will not be removed from the consumer accessible cooling device by a consumer may also defrost the interior of the consumer accessible cooling device such that the interior walls are cleaned.

In some embodiments, the pressurized composition may partially freeze upon agitation of the sealed container by the consumer. In other embodiments, the pressurized composition may remain a liquid upon agitation of the sealed container and then partially freeze when the sealed container is opened. In further embodiments, a portion of the pressurized composition may partially freeze upon agitation of the sealed container by the consumer and then another portion of the pressurized composition may partially freeze upon opening of the sealed container. In yet further embodiments, the pressurized composition may freeze upon opening and pouring of the pressurized composition into a receptacle such as a drinking glass or cup.

According to particular embodiments of the invention, the sealed container may comprise a bottle, a can, a bag, or a box, for example. However, it should be understood that the sealed container may be any closed vessel known in the art for use in packaging and storing which is capable of containing the pressurized composition and capable of being cooled to a supercool temperature. The sealed container may be made out of a plastic, glass, or a metal. For example, the sealed container may be made out of a conventional thermoplastic, such as PET (polyethylene terephthalate), PLA (polylactide acid), PP (polypropylene), polycarbonates, combinations thereof, or similar types of materials. In alternate embodiments, the sealed container may be made out of a metal. For example, the sealed container may be made out aluminum, manganese, magnesium, steel, combinations thereof; or similar types of materials. In general, the conventional packaging for the particular type of composition being pressurized and supercooled to form the pressurized composition typically used can also be used in embodiments of the present invention as the sealed container. For example, plastic beverage containers typically used for packaging carbonated beverages can be used in embodiments of the present invention as the sealed container.

As used herein, "pressurized composition" refers to a composition under positive pressure relative to atmospheric pressure. As used herein, "supercool temperature" refers to the chilling of the pressurized composition below its freezing point without freezing the pressurized composition (i.e., not causing a phase change from liquid to solid). As used herein, "partially solidified flowable composition" refers to a composition comprising at least a solid portion and a liquid portion, and maybe a gas portion, which is capable of having the motion of a fluid.

In particular embodiments, the pressurized composition (also referred to herein as "the composition") may include a solvent and a solute substantially dissolved in the solvent. For example, the pressurized composition may comprise, but is not limited to, a beverage. In other embodiments, the pressurized composition may be selected from the group consisting of water, flavored water, carbonated water, syrup, diet beverages, carbonated soft drinks, fruit juices, fruit containing beverages, vegetable juices, vegetable containing beverages, isotonic beverages, non-isotonic beverages, soft drinks containing a fruit juice, coffee, tea, dairy products, soy products, and combinations thereof. According to particular embodiments of the present invention, the pressurized composition can comprise beverage formulations already in use to provide well-known or familiar drinks, such as cola, diet cola, lemon-lime cola, orange cola, orange juice, beer, and root beer, for example. An example of a suitable pressurized composition for embodiments of this invention include, but are not limited to a beverage comprising water as a solvent and sucrose as a solute. In other embodiments of the present invention, suitable pressurized compositions may include beverages comprising components selected from the group consisting of lactose, maltose, high fructose corn syrup, fructose, dextrose, salt, nonfat milk solids, whey solids, and combinations thereof.

According to particular embodiments of the present invention, the solvent may be water, juice, or alcohol, for example. Generally, the amount of solvent present in the pressurized composition varies widely depending on the particular pressurized composition. For example, in an embodiment wherein the pressurized composition is a carbonated beverage, the amount of solvent present in the pressurized composition may be related to the particular solute present, the amount of solute present and/or the desired beverage formulation. Those of ordinary skill in the art will readily ascertain the appropriate amount of solvent required for particular pressurized compositions based on the particular solute, the particular solvent, the amount of solvent present, the pressure, and the supercool temperature, as each are described in relation to the pressurized composition.

In embodiments of the present invention, the solute may comprise a gas, for instance. In particular embodiments, the solute may include, but is not limited to, carbon dioxide or nitrogen. In other embodiments, the solute may be selected from the group consisting of sucrose, lactose, maltose, high fructose corn syrup, fructose, dextrose, salt, nonfat milk solids, whey solids, flavorings, colorings, and combinations thereof. Generally, the amount of solute present in the pressurized composition varies widely depending on the particular pressurized composition. For example, in an embodiment wherein the pressurized composition is a carbonated beverage, the amount of solute present in the pressurized composition may be dependant on the particular solute, the pressure, the supercool temperature, and/or the desired beverage formulation. Those of ordinary skill in the art will readily ascertain the appropriate amount of solute required for particular pressurized compositions according to compositions based on the particular solute, the particular solvent, amount of solvent, the pressure, and the supercool temperature based on the detailed discussion of the function of the solute below. For example, in embodiments where the pressurized composition comprises water as the solvent and the solute comprises sucrose, the solute is present in the pressurized composition in an amount ranging from 0.1 Brix to 30 Brix. More particularly, the solute comprising sucrose may be present in the pressurized composition in an amount ranging from 0.1 Brix to 20. Still more particularly, the solute comprising sucrose may be present in the pressurized composition in an amount ranging from 6.8 Brix to 12 Brix.

In particular embodiments, the packaged composition further comprises a component selected from the group consisting of sucrose, lactose, maltose, high fructose corn syrup, fructose, dextrose, salt, nonfat milk solids, whey solids, and combinations thereof.

Within the packaged composition, the pressurized composition is at a pressure greater than the atmospheric pressure. Thus, at such a pressure and a supercool temperature, the pressurized composition remains in a liquid phase while the sealed container remains sealed. However, when the sealed container is opened, the pressurized composition at least partially freezes. The mechanisms which cause the partial freezing of the composition are discussed in further detail below. According to particular embodiments of the present invention, the pressure is greater than 2.7 carbon dioxide volumes. More particularly, the pressure is greater than 3.1 carbon dioxide volumes. Still more particularly, the pressure is greater than 3.1 nitrogen volumes. Generally, the pressure of embodiments of the pressurized composition may be enabled by the sealed container used. For example, a higher pressure may be used in embodiments where the sealed container is metal than in embodiments where the sealed container is plastic. In addition, it should be understood by a person skilled in the art that the pressure used in embodiments of the present invention also depends on the supercooled temperature and the formulation of the pressurized composition. For instance, the pressure and temperature may be interrelated by the relationship $PV=nRT$, where P is the absolute pressure of the gas in the sealed container, V is the volume of gas in the sealed container, n is the moles of gas in the sealed container, R is the gas constant, and T is the absolute temperature of the gas in the sealed container.

The supercool temperature may be any temperature below the freezing point of the composition at which the pressurized composition remains in a liquid phase. According to particular embodiments of the present invention, the supercool temperature is between $-3.0°$ C. and $-7.0°$ C. More particularly, wherein the supercool temperature is between $-3.5°$ C. and $-6.0°$ C. Still more particularly, the supercool temperature is between $-3.5°$ C. and $-5.0°$ C. It should be understood by a person skilled in the art that the supercooled temperature used in embodiments of the present invention also depends on the pressure and the formulation of the pressurized composition. For instance, the temperature and pressure may be interrelated by the relationship $PV=nRT$, where P is the absolute pressure of the gas in the sealed container, V is the volume of gas in the sealed container, n is the moles of gas in the sealed container, R is the gas constant, and T is the absolute temperature of the gas in the sealed container.

According to particular embodiments of the invention, methods for providing a partially solidified flowable composition comprise providing a pressurized composition in a liquid phase within a sealed container. The partially solidified flowable composition may comprise a beverage having ice, ice cream, or similar compositions. The pressurized composition includes a solvent and a solute substantially dissolved in the solvent. In addition, the pressurized composition is at a pressure greater than atmospheric pressure such that while the pressurized composition is at a supercool temperature within the sealed container, the pressurized composition remains in the liquid phase for up to 1 year while the sealed container remains sealed in a consumer accessible cooling device and at least partially freezes, but remains flowable, in response to the sealed container being removed from the consumer accessible cooling device and opened or agitated by a consumer.

In particular embodiments of the present invention, the pressurized composition may be any of the pressurized compositions described above. Embodiments of the solvent may be any of the solvents described above. In addition, embodiments of the solute may comprise any of the solutes described above. Furthermore, the pressure may be between any of the pressure ranges stated above. Additionally, the supercool temperature may be between any of the supercool temperature ranges specified above.

Without being bound by theory, it is believed that the pressurized composition remains in a liquid phase for up to 1 year while the sealed container remains sealed in the consumer accessible cooling device due to the freezing point depression of the pressurized composition resulting from the solutes used, the control of the supercool temperature, and the pressure within the sealed container. These three factors are interrelated and combine to impart the described properties of the pressurized composition.

First, freezing point depression of the pressurized composition is achieved by the presence of the solute in the solvent. This freezing point depression provides a wider range of supercool temperatures at which the pressurized composition will not freeze while the sealed container is sealed in a consumer accessible cooling device. Thus, there is greater control of the pressurized composition so that it remains in a liquid phase in the sealed container in a consumer accessible cooling device. For example, in embodiments where the solute is sucrose, the pressurized composition is prevented from freezing in the sealed container between a range of supercool temperatures spanning a few degrees during an extended period of time.

Second, the supercool temperature must be controlled to remain below a temperature at which the pressurized composition freezes in the sealed container while it is in the consumer accessible cooling device (However, it should be understood that the pressurized composition must be within a particular range of supercool temperatures to partially freeze upon opening or agitation by the consumer of the sealed container, which again requires the appropriate temperature control.) Third, the pressure within the seat container must be high enough to maintain the pressurized composition in a liquid phase while the sealed container is sealed. In particular, the gas pressure in the seal container contributes to maintaining solvents such as water in the liquid phase if the pressurized composition is agitated because water is liquid at high pressures and low temperatures (This property of water is discussed in more detail below in relation the phase diagram of water.).

Without being bound by theory, one physical mechanism which can account for the partial freezing of the pressurized composition in response to the sealed container being opened at a supercool temperature is that there is a reduction of the pressure of the within the container resulting in a phase change of the solvent. In embodiments wherein the solvent is water, the phase diagram of water explains this phase change. The phase diagram of water has a liquid-solid line with a negative slope. Thus, water is liquid in the region at a higher pressure. Once the pressure on the composition is reduced and approaches atmospheric pressure, the composition enters the solid region and freezes since the water is at a supercool temperature (i.e., a temperature under its freezing point).

Without being bound by theory, another physical mechanism which can account for the partial freezing of the pressurized composition when the sealed container is opened is the release of a gas solute from the composition, which agitates the molecules of the composition to provide nucleation sites needed for crystal formation. The release of the soluble gas pressure acts as a catalyst and provides the nucleation sites require for ice to form.

Alternatively, and again without being bound by theory, in embodiments where the solute is a gas, another physical mechanism which can account for the partial freezing of the pressurized composition in response to the sealed container being opened at a supercool temperature is that there is a release of at least a portion of the solute to an environment, thus resulting in an increase in the freezing point of the solvent and a phase change of the solvent. Specifically, when the pressure is reduced by the opening of the sealed container, the solubility of the gas solute in the solvent is decreased and the gas comes out of solution, causing the freezing point of the composition to increase with the decrease in the gas concentration in the composition. In addition, the reduction in pressure causes a reduction in the density of the gas, thereby increasing the dissolution of the gas and further increasing the freezing temperature of the composition. Therefore, since the packaged composition is at a supercool temperature, the composition at least partially freezes.

Again, without being bound by theory, other mechanisms which may increase the rate or extent of the freezing of the composition includes the endothermic release of a gas solute from the composition, which decrease the temperature of the pressurized composition.

In use, embodiments of the packaged compositions and methods of the present invention may be employed in providing packaged beverages, dairy products, or the like, which may be ingested. For example, the packaged composition may comprise a bottled beverage which is stored at a supercool temperature. During storage, transport, and handling, the beverage remains in a liquid phase. Upon opening or agitation by the consumer of the bottled beverage, the water in the beverage at least partially freezes. Thus, a beverage is provided with ice which is not added to the beverage to cause dilution of the beverage and which maintains the cold temperature of a beverage for as long as possible.

It should be understood that the foregoing relates to particular embodiments and that numerous changes may be made therein without departing from the scope of this disclosure as defined from the following claims.

I claim:

1. A method for extending a shelf life of at least one packaged composition within a consumer accessible cooling device adapted to cool the at least one packaged composition to a composition temperature which is a first supercooled temperature, the method comprising,
storing the at least one packaged composition within the consumer accessible cooling device at a first supercooled temperature, wherein the at least one packaged composition comprises a pressurized composition in a liquid phase within a sealed container, the pressurized composition comprising a solvent and a solute substantially dissolved in the solvent, and wherein the pressurized composition is at a pressure greater than atmospheric pressure, remains liquid while the at least one packaged composition is maintained at the first supercooled temperature in the consumer accessible cooling device, and at least partially freezes in response to the sealed container being removed from the consumer accessible cooling device and opened or agitated by the consumer; and
increasing the composition temperature to a second temperature during a time period in which the at least one packaged composition will not be removed from the consumer accessible cooling device by a consumer.

2. The method of claim 1, wherein the second temperature is above the freezing point of the pressurized composition.

3. The method of claim 1, wherein the first supercooled temperature is between −3.0° C. and −7.0° C.

4. The method of claim 1, wherein the first supercooled temperature is between −3.5° C. and −6.0° C.

5. The method of claim 1, wherein the first supercooled temperature is between −3.5° C. and −5.0° C.

6. The method of claim 1, wherein the second temperature is greater than the first supercooled temperature and is between −5.0° C. and 20° C.

7. The method of claim 1, wherein the second temperature is greater than the first supercooled temperature and is between 0° C. and 10° C.

8. The method of claim 1, wherein the second temperature is greater than the first supercooled temperature and is between 0° C. and 5° C.

9. The method of claim 1, wherein the pressurized composition is a beverage.

10. The method of claim 1, wherein the shelf life of the at least one packaged composition is extended by up to 12 months.

11. The method of claim 1, wherein the shelf life of the at least one packaged composition is extended by up to 3 months.

12. The method of claim 1, wherein the shelf life of the at least one packaged composition is extended by up to 1 month.

13. A method for providing a packaged composition comprising:
providing a pressurized composition in a liquid phase within a sealed container, the pressurized composition comprising a solvent and a solute substantially dissolved in the solvent, wherein the pressurized composition is at a pressure greater than atmospheric pressure;
cooling the pressurized composition in the sealed container in a consumer accessible cooling device at a point of sale to a composition temperature which is a first supercooled temperature, the pressure and the first supercooled temperature being maintained such that the pressurized composition at least partially freezes in response to the sealed container being removed from the consumer accessible cooling device and opened or agitated by a consumer but remains flowable; and
increasing the composition temperature to a second temperature during a time period in which the at least one packaged composition will not be removed from the consumer accessible cooling device by a consumer.

14. The method of claim 13, wherein the second temperature is above the freezing point of the pressurized composition.

15. The method of claim 13, wherein the first supercooled temperature is between −3.0° C. and −7.0° C.

16. The method of claim 13, wherein the first supercooled temperature is between −3.5° C. and −6.0° C.

17. The method of claim 13, wherein the first supercooled temperature is between −3.5° C. and −5.0° C.

18. The method of claim 13, wherein the second temperature greater than the first supercooled temperature and is between −5.0° C. and 20° C.

19. The method of claim 13, wherein the second temperature greater than the first supercooled temperature and is between 0° C. and 10° C.

20. The method of claim 13, wherein the second temperature greater than the first supercooled temperature and is between 0° C. and 5° C.

21. The method of claim 13, wherein the pressurized composition is a beverage.

22. The method of claim 13, wherein the shelf life of the at least one packaged composition is extended by up to 12 months.

23. The method of claim 13, wherein the shelf life of the at least one packaged composition is extended by up to 3 months.

24. The method of claim 13, wherein the shelf life of the at least one packaged composition is extended by up to 1 months.

* * * * *